United States Patent [19]

Eakin

[11] Patent Number: 4,671,718
[45] Date of Patent: Jun. 9, 1987

[54] EXPANDING LATCH CAPTIVE BOLT FASTENER

[75] Inventor: David M. Eakin, Saratoga, Calif.

[73] Assignee: The United States of America as represented by the Secretary of the Navy, Washington, D.C.

[21] Appl. No.: 757,564

[22] Filed: Jul. 22, 1985

[51] Int. Cl.⁴ .......................................... F16B 21/00
[52] U.S. Cl. ..................................... 411/345; 24/606; 24/609; 81/125; 81/177.85; 292/55; 403/408.1
[58] Field of Search ............... 81/125, 177.85; 292/55, 292/252; 411/340, 341, 344, 345, 32, 33, 21; 24/606–609, 453; 403/405.1, 408.1; 70/386

[56] References Cited

U.S. PATENT DOCUMENTS

| 135,822 | 2/1873 | Laforge | 292/55 X |
|---|---|---|---|
| 148,102 | 3/1874 | Williamson et al. | 70/168 |
| 737,667 | 9/1903 | Schunck | 70/168 |
| 1,124,981 | 1/1915 | Weaver | 81/125 X |
| 1,426,848 | 8/1922 | Dodsworth | 403/405.1 X |
| 2,185,161 | 12/1939 | Tinnerman | 292/254 |
| 2,192,484 | 3/1940 | Bryan | 411/340 X |
| 2,792,963 | 5/1957 | Smith | 292/55 X |
| 2,839,808 | 6/1958 | Zahodiakin | 24/221 |
| 3,101,981 | 8/1963 | McCally | 292/55 X |
| 3,287,052 | 11/1966 | Wartian | 292/254 |
| 3,360,910 | 1/1968 | Soltis | 55/438 |
| 4,355,830 | 10/1982 | Rau, III | 292/254 |
| 4,553,889 | 11/1985 | Le Dantec et al. | 411/344 X |

FOREIGN PATENT DOCUMENTS

| 21868 | 7/1930 | Australia | 24/608 |
|---|---|---|---|
| 853514 | 10/1952 | Fed. Rep. of Germany | 411/21 |
| 1123325 | 6/1956 | France | 411/345 |
| 571791 | 1/1958 | Italy | 24/608 |
| 571915 | 1/1958 | Italy | 411/345 |

Primary Examiner—Gary L. Smith
Assistant Examiner—Lloyd A. Gall
Attorney, Agent, or Firm—R. F. Beers; C. D. B. Curry; W. C. Daubenspeck

[57] ABSTRACT

A fastener in which a captive bolt engages a cylindrical nut within a cylindrical confining housing. The cylindrical nut has a longitudinal slot in which a pair of oppositely facing latches are disposed and which cooperate with the housing to prevent the rotation of the nut. Rotation of the captive bolt moves the cylindrical nut longitudinally within the housing and operates to extend the ends of the latches to engage a surface or to retract the ends of the latches to within the nut.

3 Claims, 8 Drawing Figures

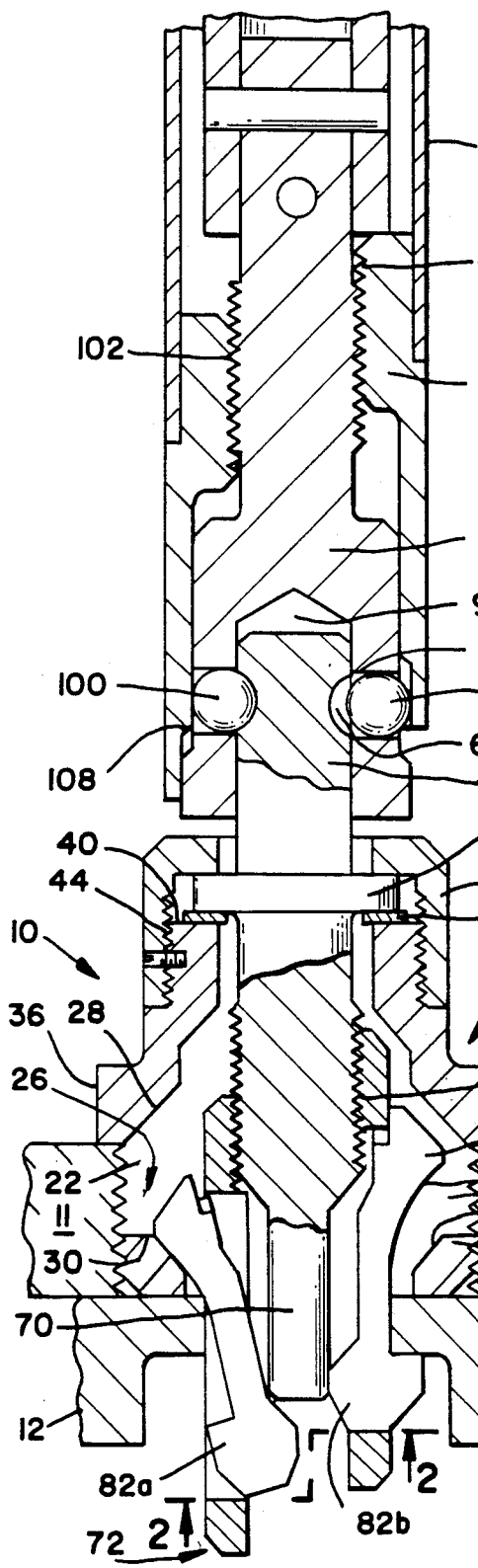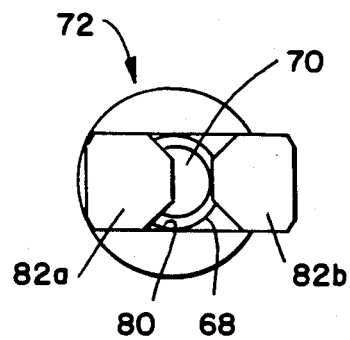
FIG _ 2
FIG _ 1

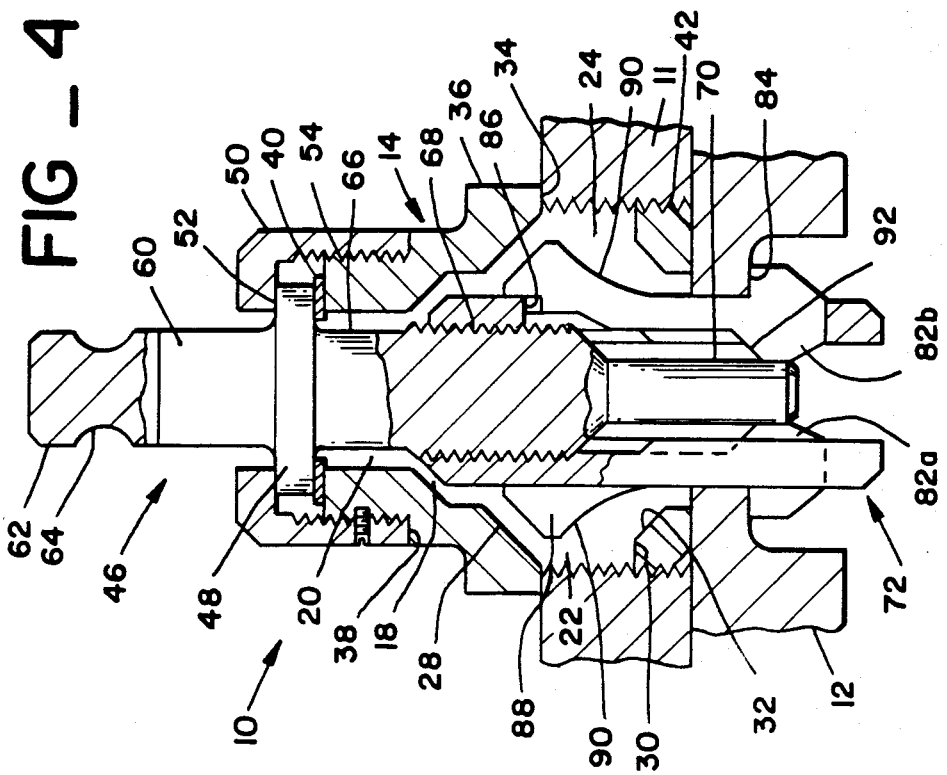
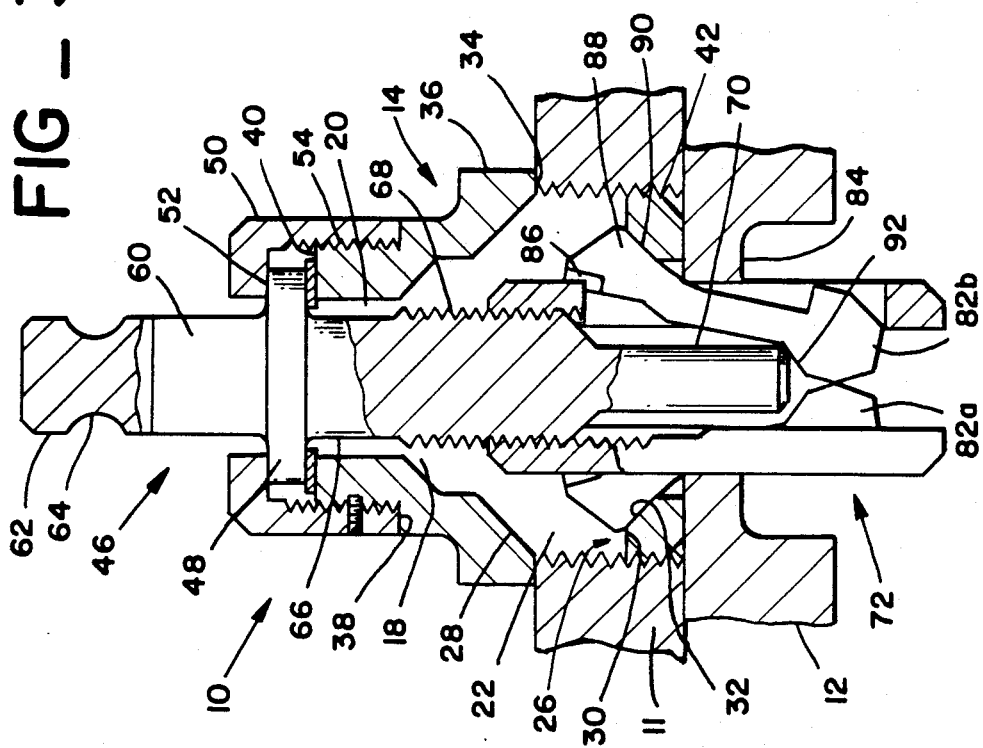

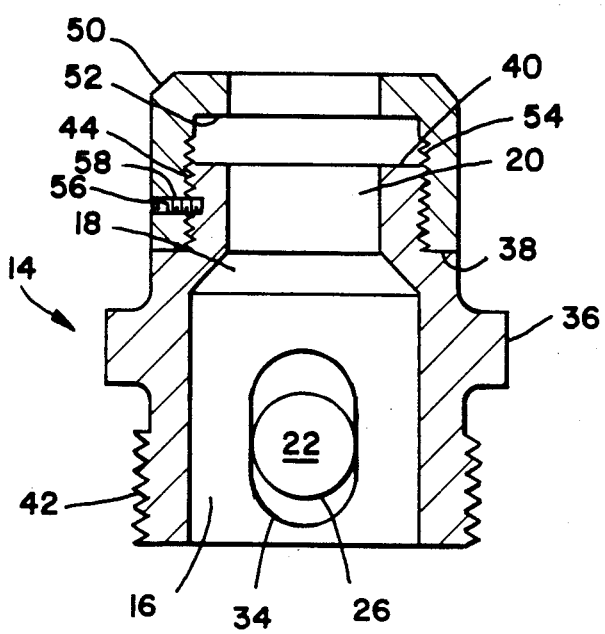
FIG_5
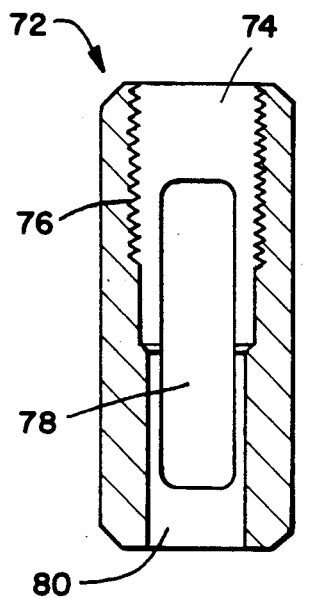
FIG_6
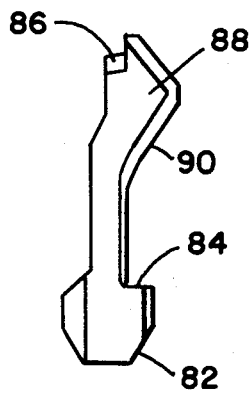
FIG_7a
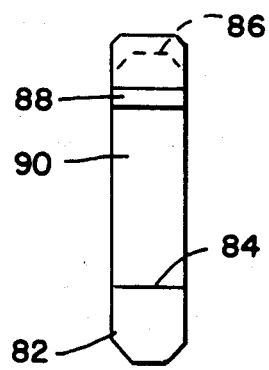
FIG_7b

4,671,718

EXPANDING LATCH CAPTIVE BOLT FASTENER

BACKGROUND OF THE INVENTION

This invention relates in general to fasteners and, in particular, to a clamping fastener having lifting capabilities. The invention is related especially to a captive bolt fastener having lifting capability and the ability to engage a blind non-threaded hole.

In a particular aerospace application, it is required to clamp together two plate-like members through concentric holes in each member at a plurality of locations and then to lift the clamped members by lifting from the clamping apparatus. The concentric holes are not visible to the person performing the operation. Previously, this task was accomplished by providing a threaded insert in the blind hole in the lower member and threading a captive bolt fastener through the hole in the top plate into the insert. The threaded insert was required to float in the blind hole in order to ensure the proper alignment at each of the clamping locations. This floating interface between the insert and the bolt occasionally produces cross threading and thread jamming as the bolt engages the floating insert.

SUMMARY OF THE INVENTION

It is therefore an object of the present invention to provide a fastener for clamping together plate-like members through concentric holes in each member.

Another object of the present invention is to provide a blind fastener having lifting capabilities.

Another object of the present invention is to provide a captive bolt fastener that eliminates cross threading and thread jamming.

Another object of the present invention is to provide a captive bolt fastener having the ability to engage a blind non-threaded hole.

Another object of the present invention is to provide a captive bolt fastener in which full tension capability and lifting capability are actuated or unactuated by turning the bolt clockwise or counter clockwise, respectively.

These objects and others are provided by an expanding latch captive bolt fastener in which a captive bolt engages a cylindrical nut within a cylindrical confining housing. The cylindrical nut has a longitudinal slot in which a pair of oppositely facing latches are disposed and which cooperate with the housing to prevent the rotation of the nut. Accordingly, rotation of the captive bolt causes the cylindrical nut to move longitudinally within the housing. The longitudinal movement of the nut operates to extend the ends of the latches to engage a surface or to retract the ends of the latches to within the nut. With the latches retracted, the cylindrical housing is threaded into the upper member. The captive bolt is then rotated to extend the latches to engage the lower member.

The advantages and features of the present invention will become better understood from the following detailed description of the preferred embodiment in conjunction with the accompanying drawings wherein:

BRIEF DESCRIPTION OF THE DRAWINGS

FIG. 1 is a cross-sectional view illustrating the fastener of the present invention with the latches shown in the engaged position on the right and the unengaged position on the left and the ball-lock mechanism shown in the engaged position on the left and the unengaged position on the right;

FIG. 2 is an end view along line 2—2 in FIG. 1 of the fastener with the latches positioned as shown in FIG. 1;

FIG. 3 is a partially cross-sectional, partially cutaway view of the fastener with the latches in the unengaged position;

FIG. 4 is a partially cross-sectional, partially cutaway view of the fastener with the latches in the engaged position;

FIG. 5 is a cross-sectional view of the housing and retainer of the fastener;

FIG. 6 is a cross-sectional view of the cylindrical nut of the fastener; and

FIGS. 7a and 7b are plan views illustrating the latches of the fastener.

DESCRIPTION OF THE PREFERRED EMBODIMENT

Referring now to the drawings, FIGS. 1-4 show the preferred embodiment of an expanding latch bolt captive fastener 10 in conjunction with a first member 11 (the upper member) and a second member 12 (the lower member) which are to be clamped together by the fastener. The preferred embodiment of a fastener 10 of the the present invention has a housing 14 of generally cylindrical cross-section. The housing 14, which is most clearly shown in the isolated view of FIG. 5, has a central bore including an cylindrical lower section 16 which tapers at 18 to a smaller diameter upper section 20. The cylindrical wall of the housing 14 has two opposing openings 22 and 24 into the lower section 16 of the central bore. As best illustrated by FIGS. 1, 3 or 4 in combination with FIG. 5, the openings 22 and 24 have a circular aperture 26 at the outer surface of the wall and expand along an upper sloping shoulder 28 and, after a non-sloping shoulder 30, a lower sloping shoulder 32 to present an elongated aperture 34 at the inner surface of the wall. The housing 14 has an outer circumferential rib 36 disposed immediately above the circular apertures 26 and an outer upward facing annular shoulder 38 disposed above the circumferential rib. The upper end of the housing 14 forms an annular shoulder 40. The housing has circumferential threads 42 at the lower end and circumferential threads 44 at the upper end.

A captive threaded bolt 46 is disposed through the central bore of the housing 14. The bolt 46 has a circumferential rib 48 which is adapted to be secured against the annular shoulder 40 of the housing 14 by a cylindrical retainer 50. The retainer 50 has an inner annular surface 52 which secures the circumferential rib 48 against the annular shoulder 40 to prevent longitudinal travel of the bolt in housing 14. A washer 53 and/or suitable lubrication may be disposed between the rib 48 and the annular shoulder 40 and between the rib 48 and the inner annular surface 52 to facilitate rotary motion of the threaded bolt 46.

As shown in FIG. 5, the retainer 50 has internal threads 54 which engage threads 44 of the housing 14. The retainer is locked in position by a set screw 56 in combination with a receiving hole 58 in the housing 14. Above the circumferential rib 48, the bolt has a cylindrical section 60 which leads to a square head 62 having spherical indentations 64 in each of the four sides for receiving the spheres of a square drive mechanism to be described hereinafter.

Below the circumferential rib 48, the bolt 46 has a non-threaded section 66 and a threaded section 68. Below the threaded section 68, the bolt 46 tapers to smaller diameter section 70. When the circumferential rib 48 is secured against the annular shoulder 40, the non-threaded section 66 of the bolt is disposed in the narrower upper section 20 of the central bore and the threaded section 68 extends from the tapered section 18 into the lower section 16 of the central bore. The smaller diameter section 70 extends from approximately the level of the center of the circular apertures 26 to beyond the lower end of the housing 14 as shown in the FIGS. 1, 3, and 4.

A cylindrical nut 72, which extends into the lower section 16 of the bore from the lower end of the housing 14, is threaded onto the threaded section 68 of the bolt 46. The cylindrical nut 72, best shown in the isolated view of FIG. 6, has an internal bore 74 having a threaded section 76, a longitudinally oriented slot 78 and a second internal bore 80.

A pair of identical latches 82a and 82b, best illustrated in the plan views of FIGS. 7a and 7b, are disposed in the slot 78 of the cylindrical nut 72 as shown in the FIGS. 1-4. The latches 82a and 82b have a first shoulder 84 at the lower end for securing the fastener against the surface of the second member 12 and a second shoulder 86 at the upper end which abuts the surface of the cylindrical nut 72 at the top of the slot 78. The upper ends 88 of the latches are adapted to be retained in the openings 22 and 24 of the housing 14. This prevents rotation of the cylindrical nut 72 upon rotation of the bolt 46. The latches 82a and 82b also have a first cam surface 90 which follows the lower sloping shoulder 32 of the housing 14 and a second cam surface 92 which follows the surface at the end of the bolt 46.

Referring to FIG. 1, the square drive mechanism includes a lifting member 94 having a cavity 96 adapted to receive the head 62 of the captive bolt 46. The lifting member 94 has four openings 98 containing spheres 100 for mating with the spherical indentations 64 in the head 62. The lifting member has a threaded section 102 which mates with the threads 104 of a sleeve 106. The directions of threads 102 and 104 are selected to provide downward travel of the sleeve 106 when the lifting member 94 is rotated clockwise relative to the sleeve 106. The sleeve 106 has an annular shoulder 108 which locks the spheres in the indentations 64 of the bolt head 62 when the drive mechanism is engaged. An cylindrical extension 110 is secured to the sleeve 106 to permit axial travel and prevent rotation.

In operation, the expanding latch captive bolt fastener 10 functions in conjunction with two concentric holes, one hole in each of the members to be clamped together. The first member 11 (the upper of the two members) is provided with a threaded hole to provide permanant mounting of the housing 14. The second member 12 (the lower of the two members) is provided with a non-threaded hole adapted to receive the cylindrical nut 72. Initially, the captive bolt 46, which is restrained from moving axially with respect to the housing 14 by the retainer 50, is rotated to retract the lower ends of the latches 82a and 82b to within the circumference of the cylindrical nut 72 as illustrated in FIG. 3. Because the cylindrical nut 72, which is threadably attached to the captive bolt 46, is restrained from rotating by the latches protruding into the holes 24 and 22 of the housing and the slots 78 of the nut, the rotation of the bolt 46 causes the cylindrical nut 72 to travel longitudinally in the housing 14 on the threads of the bolt. When the cylindrical nut 72 travels down the bolt 46, the lower ends of the latches 82a and 82b are retracted through the cam-like action of the first cam surface 90 of the latches following the lower sloping shoulders 32 of the housing 14. The direction of the threads of the cylindrical nut 72 and the bolt 46 are preferably chosen to allow counterclockwise rotation of the bolt implement downward travel of the nut and clockwise rotation, correspondingly, to implement upward travel. Thus counterclockwise rotation retracts the latches 82a and 82b into a position where the housing with the cylindrical nut 72 can be inserted through the non-threaded hole in the second member as shown in FIG. 3.

After the expanding latch captive bolt fastener 10 is disposed through the two concentric holes in members 11 by threads 42 and 12 (the housing 14 threadably engaged to the upper member 11), the captive bolt 46 is rotated in the clockwise direction to extend the latches 82a and 82b to clamp the lower member 12, effectively clamping members 11 and 12 together. Clockwise rotation of the captive bolt 46 causes the cylindrical nut 72 to travel up the bolt within the housing 14. This upward travel of the cylindrical nut 72 first moves the second cam surfaces 92 of the latches 82a and 82b against the end of the bolt 46 to force the latches to the latch-extended position. Continued clockwise rotation preloads the fastener as the shoulders 84 of the latches 82a and 82b clamp against the lower surface of the lower member 12. In particular, the lower member is secured between the shoulders 84 and the base of the housing 14.

The captive bolt 46 is turned by the square drive mechanism. The square drive mechanism is engaged by clockwise rotation within the sleeve 106 which does not rotate but causes the sleeve to travel downward on the threads 102 of the lifting member 94. As a result of the downward travel of sleeve 106, the spheres 100 of the lifting member 94 are forced into the indentations 64 of the square head 62 of the bolt 46 to lock the lifting member to the captive bolt. Further clockwise rotation of the lifting member 94 coupled to the captive bolt 46 will actuate the fastener 10 as previously described. The square drive mechanism accomodates torsion and the spheres accomodate tension loads on the head 64 of the bolt 46 and provides a lifting capability.

A preloaded fastener 10 is disengaged by counterclockwise rotation of the lifting member 94 which will sequentially relieve the preload, retract the latches 82a and 82b, and simultaneously move the sleeve to disengage the spheres to the square drive mechanism of the bolt.

Obviously many modifications and variations of the present invention are possible in light of the above description. It is therefore to be understood that within the scope of the appended claims the invention may be practiced otherwise than as specifically described.

What is claimed is:

1. An expanding latch bolt captive fastener for joining together a plate-like upper member having a threaded aperture and a plate-like lower member having a non-threaded aperture, which comprises:
   (a) a bolt having a central threaded section, a barrel section at one end on one side of the central threaded section, said barrel section having a smaller diameter than said threaded section, and said bolt having a circumferential rib on the other side of said threaded section;

(b) a housing having a cylindrical cross-section and a circular outer surface, said housing having a central bore including a cylindrical lower section which tapers to a cylindrical upper section, said central bore forming an inner surface of said housing, said housing having two opposing openings from said outer surface into said lower section of the central bore, said opposing openings being circular at said outer surface and expanding to be elongated at said inner surface, a sloping shoulder being provided thereby between said outer surface and said inner surface, said outer surface of the housing having a first circumferential threaded section for mating with the threaded aperture of the upper member, said first circumferential threaded section extending from the end of the lower section of the cylindrical bore to the region of said opposing circular openings, and said housing having an outer circumferential rib disposed above said first circumferential threaded section;

(c) a cylindrical nut disposed in the lower section of said housing, said cylindrical nut having an internal threaded section at an upper end for receiving the threaded section of said bolt, the barrel section of said bolt being disposed within said cylindrical nut when said bolt is threaded into said cylindrical nut, said cylindrical nut having a longitudinally oriented slot having a top end and a bottom end, said slot extending through said nut;

(d) a pair of oppositely facing latches disposed within said cylindrical nut in said longitudinally oriented slot, each said latch having an upper end adapted to be retained in the opposing openings of said housing, each said latch having at a lower end a first shoulder for abutting the lower surface of the lower member, each said latch having a second shoulder at the upper end for abutting the cylindrical nut at the top of the longitudinal slot, each said latch having a first cam surface for following the sloping shoulder of said housing, and each said latch having a second cam surface for following the barrel of the bolt; and (e) a retainer for preventing longitudinal travel of said bolt relative to said housing, said retainer maintaining said circumferential rib of said bolt against said housing.

2. An expanding latch bolt captive fastener as recited in claim 1 wherein said fastener further includes a square drive means comprising:

(a) said bolt having a square head section having spherical indentations;

(b) a lifting member having a cavity adapted to recieve the square head secton of the bolt, said lifting member having openings containing spheres for mating with the spherical indentations in the head of the bolt, said lifting member having an externally threaded section; and (c) a sleeve having an internal annular shoulder and an internal threaded section for engaging the threaded section of said lifting member, said sleeve disposed over said lifting member, said sleeve travelling longitudinally relative to said lifting member when said lifting member is rotated, the shoulder of said sleeve locking said spheres in the indentations in said lifting member.

3. An expanding latch bolt captive fastener for joining together a plate-like upper member having a threaded aperture and a plate-like lower member having a non-threaded aperture, which comprises:

(a) a bolt having a central threaded section, a barrel section at one end on one side of the central threaded section, said barrel section having a smaller diameter than said threaded section, and said bolt having a circumferential rib on the other side of said threaded section;

(b) a housing having a cylindrical cross-section and a circular outer surface, said housing having a central bore including a cylindrical lower section which tapers to a cylindrical upper section, said central bore forming an inner surface of said housing, said housing having two opposing openings from said outer surface into said lower section of the central bore, said opposing openings being circular at said outer surface and expanding to be elongated at said inner surface, a sloping shoulder being provided thereby between said outer surface and said inner surface, said outer surface of the housing having a first circumferential threaded section for mating with the threaded aperture of the upper member, said first circumferential threaded section extending from the end of the lower section of the cylindrical bore to the region of said opposing circular openings, and said housing having an outer circumferential rib disposed above said first circumferential threaded section;

(c) a cylindrical nut disposed in the lower section of said housing, said cylindrical nut having an internal threaded section at an upper end for receiving the threaded section of said bolt, the barrel section of said bolt being disposed within said cylindrical nut when said bolt is threaded into said cylindrical nut, said cylindrical nut having a longitudinally oriented slot having a top end and a bottom end, said slot extending through said nut;

(d) a pair of oppositely facing latches disposed within said cylindrical nut in said longitudinally oriented slot, each said latch having an upper end adapted to be retained in the opposing openings of said housing, each said latch having at a lower end a first shoulder for abutting the lower surface of the lower member, each said latch having a second shoulder at the upper end for abutting the cylindrical nut at the top of the longitudinal slot, each said latch having a first cam surface for following the sloping shoulder of said housing, and each said latch having a second cam surface for following the barrel of the bolt;

(e) a retainer for preventing longitudinal travel of said bolt relative to said housing, said retainer maintaining said circumferential rib of said bolt against said housing; and a square drive means including (f) said bolt having a square head section having spherical indentations;

(g) a lifting member having a cavity adapted to receive the square head section of the bolt, said lifting member having openings containing spheres for mating with the spherical indentations in the head of the bolt, said lifting member having an externally threaded section; and (h) a sleeve having an internal annular shoulder and an internal threaded section for engaging the threaded section of said lifting member, said sleeve disposed over said lifting member, said sleeve travelling longitudinally relative to said lifting member when said lifting member is rotated, the shoulder of said sleeve locking said spheres in the indentations in said lifting member.

* * * * *